(12) United States Patent
Kepplinger et al.

(10) Patent No.: US 6,379,420 B1
(45) Date of Patent: Apr. 30, 2002

(54) METHOD AND PLANT FOR PRODUCING A REDUCING GAS SERVING FOR THE REDUCTION OF METAL ORE

(75) Inventors: Leopold Werner Kepplinger, Leonding; Johann Wurm, Bad Zell; Herbert Mizelli, Micheldorf; Walter Rainer Kastner, Zwettl a.d.Rodl; Günther Brunnbauer, Wallern, all of (AT)

(73) Assignees: Voest-Alpine Industrieanlagenbau GmbH, Linz (AT); Pohang Iron & Steel Co., Ltd.; Research Institute of Industrial Science and Technology, Incorporated Foundation, both of (KR)

( * ) Notice: Subject to any disclaimer, the term of this patent is extended or adjusted under 35 U.S.C. 154(b) by 0 days.

(21) Appl. No.: 09/227,056

(22) Filed: Jan. 7, 1999

Related U.S. Application Data

(63) Continuation of application No. PCT/AT97/00156, filed on Jul. 9, 1997.

(30) Foreign Application Priority Data

Jul. 10, 1996 (AT) .............................................. 1225/96

(51) Int. Cl.$^7$ .............................................. C21B 13/14
(52) U.S. Cl. .............................. 75/414; 75/446; 75/492; 75/505; 266/144; 266/147; 266/156
(58) Field of Search .......................... 75/446, 492, 414, 75/505; 423/439; 266/144, 147, 156

(56) References Cited

U.S. PATENT DOCUMENTS

| | | | | |
|---|---|---|---|---|
| 5,118,479 A | * | 6/1992 | Stephens, Jr. et al. | 423/439 |
| 5,185,032 A | | 2/1993 | Whipp | |
| 5,676,732 A | * | 10/1997 | Viramontes-Brown | 75/492 |
| 5,958,107 A | * | 9/1999 | Greenwalt | 75/492 |

FOREIGN PATENT DOCUMENTS

| | | |
|---|---|---|
| AT | 340973 | 1/1978 |
| EP | 0122239 | 10/1984 |
| EP | 0179734 | 4/1986 |
| EP | 0594557 | 4/1994 |
| FR | 766167 | 6/1934 |
| FR | 2236951 | 2/1975 |
| JP | 58-058206 | 4/1983 |

* cited by examiner

*Primary Examiner*—Melvyn Andrews
(74) *Attorney, Agent, or Firm*—Ostrolenk Faber Gerb & Soffen

(57) ABSTRACT

In a method for producing a hot CO- and $H_2$-containing reducing gas serving for the reduction of fine-grained metal ore, in particular iron ore, the reducing gas is formed in a gasification zone by a gasification of carbon carriers, in particular coal, taking place under the supply of oxygen and subsequently is cooled down to a reducing-gas temperature favorable to the reduction process. In order to produce a thermodynamically more stable reducing gas, the reducing gas by the addition of $H_2O$ and/or $CO_2$—in order to prevent the Boudouard and heterogeneous water-gas reaction and a resultant heating of the reducing gas—is converted to a reducing gas that is thermodynamically more stable at the reducing-gas temperature.

11 Claims, 1 Drawing Sheet

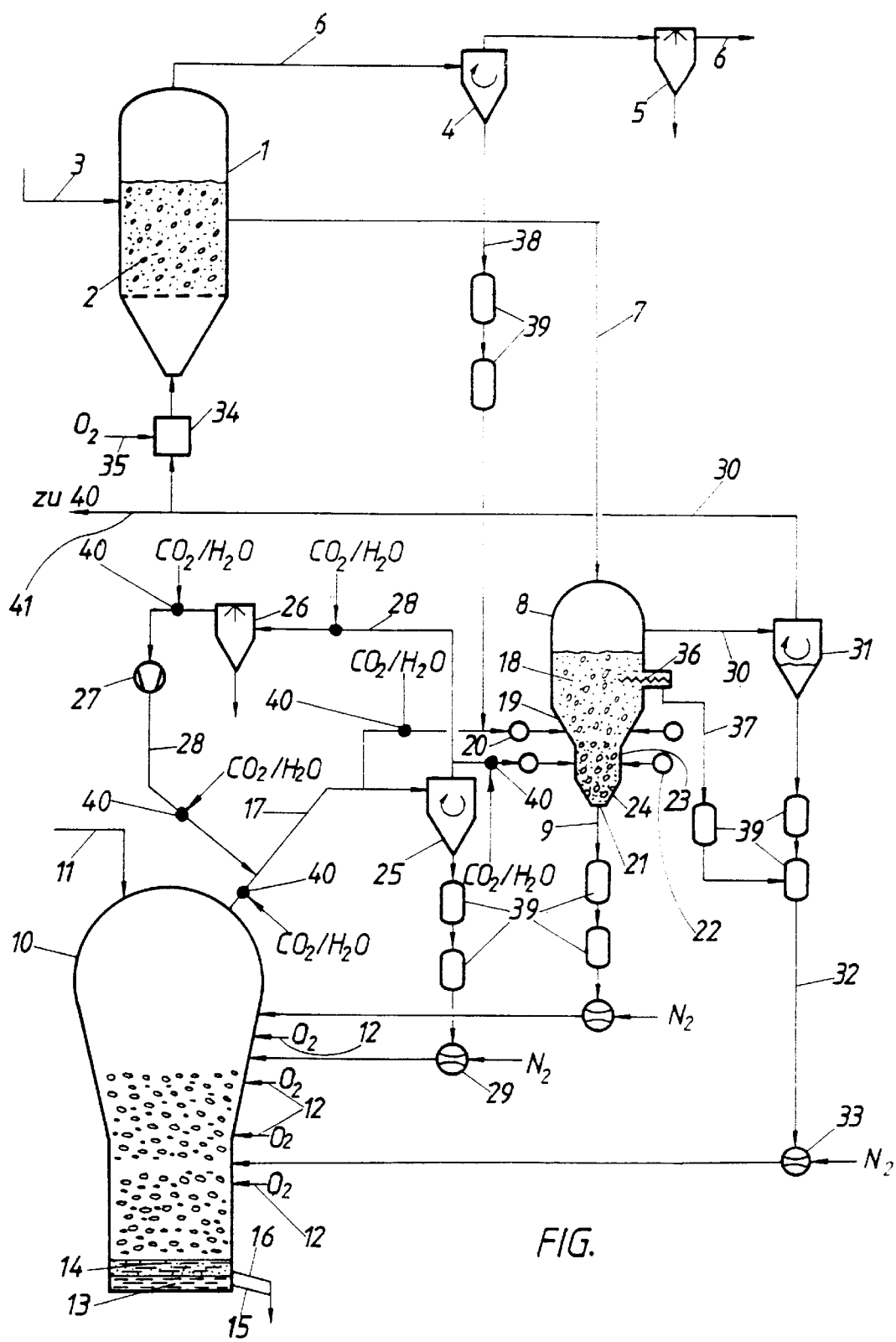
FIG.

METHOD AND PLANT FOR PRODUCING A REDUCING GAS SERVING FOR THE REDUCTION OF METAL ORE

CROSS-REFERENCE TO RELATED APPLICATIONS

This is a continuation application of international application PCT/AT97/00156, with an International filing date of Jul. 9, 1997.

The invention relates to a method for producing a hot CO— and $H_2$-containing reducing gas serving for the reduction of fine-grained metal ore, in particular iron ore, wherein the reducing gas is formed in a gasification zone by a gasification of carbon carriers, in particular coal, taking place under the supply of oxygen and subsequently is cooled down to a reducing-gas temperature favorable to the reduction process, and a plant for carrying out the method.

A method of the initially described kind is known f.i. from EP-A-0 594 557. With this known method, pig iron or a steel pre-product are won by smelting from at least prereduced sponge iron in a meltdown gasifying zone under the supply of carbon carriers and oxygen-containing gas, and a CO— and $H_2$-containing reducing gas is generated. The reducing gas forming in the meltdown gasifying zone exhibits a temperature in the range of 1000 to 1200° C. At this temperature, the released hydrocarbon compounds are decomposed. At the same time, the $CO_2$ and $H_2O$ contents drop to below 6% $CO_2$ and 4% $H_2O$ on account of these temperatures, since they are converted to CO and $H_2$.

For utilization in a reduction reactor, this very hot reducing gas has to be cooled prior to introduction into the reduction reactor. In accordance with EP-A-0 594 557 f.i., a spray cooler is provided to that end. The portion of the reducing gas thus cooled is admixed to the reducing gas exiting the melt-down gasifying zone. Such routinely effected cooling of the reducing gas by cooled reducing gas of the same type to roughly 700 to 900° C. prevents the occurrence of incipient melting of the ore particles in the reduction zone during ore reduction, but without causing a decrease in the reduction potential of the reducing gas.

Yet it is disadvantageous that the reducing gas thus cooled is thermodynamically unstable; from the carbon monoxide, carbon dioxide and carbon form in accordance with the Boudouard equilibrium, just as in accordance with the heterogeneous water-gas equilibrium a reaction of carbon monoxide with hydrogen to water and carbon takes place, which reaction is also exothermic, like the reaction described first. This leads to an increase in temperature of the reducing gas and hence to an increase in temperature of the reactor material. There will be formation of agglomerates. Hereby, not only the reduction process is affected but the yield of reactor material from the reduction zone as well. U.S. Pat No. 5,185,032 describes a method in which the hot reducing gas formed in a melter gasifier is cooled to a temperature of 900 to 950° by injection of water.

FR-A-2 236 951 discloses a method in which the hot reducing gas formed in an electric furnace is fed into a reduction shaft located directly above the electric furnace and upon entry into the reduction shaft is cooled by blowing in water, water vapor, carbon dioxide, hydrocarbons or other cooling media to prevent agglomeration of metal-oxide-containing material in the reduction shaft. The content in $CO_2$ and $H_2O$ of the thus cooled reducing gas is relatively high.

FR-A-766 167 describes a method in which the hot reducing gas formed in a melting aggregate is fed directly into a reduction chamber, and, in doing so, is cooled in the dome area of the melting aggregate, i.e. even before it is fed into the reduction chamber, either by feeding spent reducing gas after removal of carbonic acid or by feeding a mixture of carbonic acid or water vapor and coal, so as to prevent agglomeration of the charge material in the reduction chamber.

The invention aims at avoiding these disadvantages and difficulties and has as its object to provide a method of the initially described kind and a plant for carrying out the method, enabling a reducing gas to be produced lying in a temperature range that is favorable to the reduction of the metal ore, hence lying below the temperature at which instances of incipient melting and fouling may occur in the at least partially reduced metal ore. Moreover, the $H_2O$/$CO_2$— content of the reducing gas is to be optimized and, further, a chemical attack on the metallic materials of the gas-carrying systems, that is, reactors and gas conveying ducts, built-in structures etc., is to be avoided.

With a method of the initially described kind this object is achieved in that by the addition of $H_2O$ and/or $CO_2$— in order to prevent the Boudouard and heterogeneous water-gas reaction and a resultant heating of the reducing gas and thus of the metal ore—a reducing gas which has been subjected to a cooling operation that does not effect an addition of $H_2O$/$CO_2$ to the reducing gas is converted to a reducing gas that is thermodynamically more stable at the reducing-gas temperature.

By selectively adding $H_2O$ and/or $CO_2$, the thermodynamically conditioned decomposition of the reductants CO and $H_2$ is selectively influenced or prevented. In the reducing gas, ranges of concentration are adjusted at which the Boudouard and heterogeneous water-gas reaction, which is strongly exothermic, is suppressed, so that an interfering temperature increase in the reducing gas cannot take place. At the same time, the degree of oxidation of the reducing gas is controlled and the chemical attack on metallic materials suppressed by this method.

Advantageously, amounts of $H_2O$ and/or $CO_2$ are added until the Boudouard and heterogeneous water-gas equilibrium of the reducing gas at the temperature favorable to the reduction process is almost attained.

Preferably, cooling of the reducing gas can be effected by feeding cooling gas of the same type and/or top gas.

Suitably, the addition of $H_2O$ is effected by feeding water vapor and the addition of $CO_2$ is effected by feeding a $CO_2$-containing gas.

In accordance with a preferred embodiment, feeding of $CO_2$ into the reducing gas can at least partially be effected in that a reducing gas reacted in the reduction process, so-called top gas, is fed into the reducing gas. Other CO,-containing gases, f.i. from a $CO_2$-purification, may also be employed.

To attain intensive cooling of the reducing gas, cooled reducing gas of the same type is advantageously admixed to the reducing gas, as is known per se from the prior art, and $H_2O$ and/or $CO_2$ are added into the cooled reducing gas of the same type.

A plant for carrying out the method, comprising at least one reduction reactor having a conveying duct for metal ore and a reducing-gas duct running into it, comprising a gasification reactor having feed ducts for carbon carriers and oxygen-containing gases running into it and the reducing-gas duct departing from it, and comprising a cooling means which is provided in the reducing-gas duct and does not effect an addition of $H_2O$/$CO_2$ to the reducing gas, is characterized in that a $CO_2$ source and/or $H_2O$ source is (are) flow-connected with the reducing-gas duct conducting a reducing gas which has been subjected to cooling.

Advantageously, the reduction reactor is provided with a top-gas discharge duct carrying off reacted reducing gas from which a branch duct departs that is flow-connected with the reducing-gas duct.

Another preferred embodiment is characterized in that from the reducing-gas duct a reducing-gas recycle duct via a scrubber and a compressor runs into the reducing-gas duct again, but viewed in the gas flow direction at a position upstream of the branching-off point of the reducing-gas recycle duct, particularly upstream of the position of a dedustifying means provided in the reducing-gas duct, and that a $CO_2$ source and/or $H_2O$ source is connected with the reducing-gas recycle duct. A reactor comprising a stationary fluidized bed, a Venturi fluidized bed, a circulating fluidized bed or a cascade of cyclones may be provided as the reduction reactor.

The invention will now be described in greater detail with reference to an exemplary embodiment represented schematically in the drawing, wherein the Figure schematically represents an advantageous embodiment of a plant according to the invention.

Reference numeral 1 designates a preheating reactor constructed as a fluidized-bed preheating reactor, into which charging materials containing iron ore and fluxes can be charged via a charging duct 3 entering laterally on the height level of the fluidized-bed zone 2 (preheating zone). At the upper end of the fluidized-bed preheating reactor 1, the gases formed in and flowing through the same are withdrawn via a gas discharge duct 6 provided with a gas purifying cyclone 4 and a gas scrubber 5, such as a Venturi scrubber. As a high-quality export gas having a calorific value of roughly 8000 $kJ/Nm^3$, these gases are available for various uses, f.i. production of electricity with or without generation of oxygen.

Via a conveying duct 7, the total of the charging materials preheated in the fluidized-bed preheating reactor 1 passes into a reduction reactor 8 likewise constructed as a fluidized-bed reactor or fluidized-bed cascade and are for the greatest part completely reduced in the same.

Via a sponge-iron conveying duct 9 (f.i. comprising a gas injector), the reduction product formed in the fluidized-bed reduction reactor 8 passes into a melter gasifier 10; to be more precise, it is introduced on the height level of a carbon-containing bed provided in the melter gasifier, above or inside said bed. The melter gasifier has at least one feeder 11 for coal and fluxes and nozzle feeders 12 for oxygen-containing gases arranged at several height levels.

Inside the melter gasifier 10, below the melt-down gasifying zone, molten pig iron 13 and molten slag 14 collect, which can be tapped separately through one tap 15, 16 each. In the melter gasifier 10 a reducing gas is produced from the carbon carriers and the oxygen-containing gas, which reducing gas collects in the calming space above the carbon-containing bed and via a gas duct 17 is supplied to the fluidized-bed reduction reactor 8, namely via a frustoconical narrowing of the essentially shaft-shaped fluidized-bed reduction reactor 8, said narrowing forming a gas distributing bottom 19 and being provided with a view to forming a fluidized bed 18 (reduction zone), the reducing gas being fed via the periphery of said narrowing by means of a circular duct 20.

The large solids particles, which cannot be maintained in suspension in the fluidized bed, sink downward centrally by the effect of gravity and are withdrawn via a central solids discharge 21. This central solids discharge 21 is constructed such that a fixed-bed flow is formed on account of a radial gas feeder 22 that delivers into the cylindrical vessel portion 23 provided with a cone bottom 24 and arranged below the frustoconical gas distributing bottom 19, so that a satisfactory reduction can also be attained in respect of the large particles.

On account of the frustoconical shape of the gas distributing bottom 19 the superficial velocity changes as a function of the height. As a result, a special grain size distribution will adjust over the height of the gas distributing bottom 19. By suitably arranging the nozzles in the gas distributing bottom 19 it is thus feasible to form an internally circulating fluidized bed in which the gas velocity is higher in the center than at the periphery. A fluidized-bed design of this kind may be employed both for the reduction reactor 8 and for the preheating reactor 1.

A portion of the reducing gas exiting the melter gasifier 10 is subjected to purification in a hot cyclone 25, to cooling in a subsequently connected scrubber 26 and, through the recycle duct 28, is via a compressor 27 admixed back into the reducing gas exiting the melter gasifier 10. The dust separated in the hot cyclone 25 is conducted back into the melter gasifier 10 via a gas injector 29. Via the gas feeder 22 formed by a circular duct a portion of the as-yet uncooled reducing gas exiting the hot cyclone 25 passes into the fluidized-bed reduction reactor 8 through the cylindrical vessel part 23 of the same.

Via a gas duct 30 the gas withdrawn from the fluidized-bed reduction reactor 8 is supplied to a reduction cyclone 31 in which any fine particles still present in the reducing gas are separated and completely reduced. Via a conveying duct 32 and a gas injector 33 these fine particles are charged to the melter gasifier 10 roughly on the level of the upper end of the bed.

Via the gas duct 30 the partially oxidized reducing gas exiting the reduction cyclone 8 passes into the fluidized-bed preheating reactor 1, but with a portion thereof being combusted for heating the reducing gas, namely in a combustion chamber 34 into which there runs a duct 35 supplying an oxygen-containing gas.

From the fluidized-bed reduction reactor 8, a portion of the completely reduced charging materials is withdrawn on the height level of the fluidized bed 18 by a discharge screw 36 and by means of the conveying duct 37 is introduced into the melter gasifier 10 roughly on the level of the upper end of the bed via a gas injector 33, preferably together with the fine particles coming from the reduction cyclone 31.

The fine-particle material separated in the cyclone 4 of the export-gas gas discharge duct 6 is charged via a conveying duct 38 with sluices 39—which are also provided in the other conveying ducts, such as 9, 32 and 37, for the partially or completely reduced material—via the circular duct 20 supplying reducing gas to the fluidized-bed reduction reactor 8.

In detail, the functioning of the plant according to FIG. 1 is as follows:

The prepared fine ore—screened out and dried—is charged to the preheating reactor 1 pneumatically or by means of a bag conveyor or elevator. There, it is preheated to a temperature of roughly 850° C. in the fluidized-bed zone 2 and as a result of the reducing atmosphere is optionally prereduced, roughly to the wustite stage.

For this prereduction operation, the reducing gas should comprise at least 25% $CO+H_2$ so as to possess sufficient reducing power.

Subsequently, the preheated and optionally prereduced fine ore flows into the reduction reactor 8—preferably on account of gravity—in the fluidized layer or fluidized bed 18 of which the fine ore largely reduces to the Fe stage at a temperature of about 850° C. For this reducing operation, the gas should have a $CO+H_2$ content of at least 68%.

For fine ores having a longer reduction time, a second (and, if necessary, a third) fluidized-bed reduction reactor with an additional reduction cyclone is provided in series with respect to the first reduction reactor 8. With the second reduction reactor, reduction of the fine ore is carried to the wustite stage and with the first reduction reactor 8 to the Fe stage.

In the Figure, the numeral 40 denotes the most important sites of the above-described plant, at which sites the possibility of connection with a $CO_2$ source and/or $H_2O$ source, hence a feed-in means for $CO_2$— and/or $H_2O$-containing gases, can be realized in a particularly advantageous manner; the action of said gases will be described hereinbelow.

The feed-in sites 40 suitably are either located in the ducts 17 connecting the melter gasifier 10 with the reduction reactor 8 or in the reducing-gas cooling cycle 26, 27, 28. If the feed-in site 40 is located in the cooling cycle 26, 27, 28 at a position downstream of the compressor 27, advantages will result, such as f.i. the fact that the compressor 27 can be constructed on a smaller scale and that the gas having been heated on account of compression will now undergo cooling by the feeding of $H_2O$ and/or $CO_2$.

The effect of the measures set forth in the invention is described more fully with reference to Examples I to IV below, wherein Example I merely describes the prior art. All of the values cited in the gas analyses are given in volume percent.

EXAMPLE I

A reducing gas generated in accordance with the prior art, f.i. in accordance with EP-A-0 594 557, has an analysis in accordance with Table I below. The reducing gas exits the melter gasifier 10 at a temperature of 1050° C. under a pressure of 4.5 bar abs. It is to be utilized for reducing iron ore.

TABLE I

| | |
|---|---|
| CO | 65% |
| $H_2$ | 30% |
| $CO_2$ | 1% |
| $H_2O$ | 1% |
| $CH_4$ | 1% |
| $N_2$ | 2% |

To attain a reducing-gas temperature of roughly 850° C., cooling gas has to be admixed to the reducing gas. In accordance with Example I, cooling gas of the same type is admixed at a temperature of 70° C., which also exhibits a pressure of 4.5 bar abs. In order to attain the temperature of 850° C., 27.8% cooling gas have to be admixed. From this, the following disadvantages result:

A very substantial quantity of cooling gas is required, which is to say that a substantial portion of hot reducing gas has to be branched off and subjected to a cooling operation involving considerable expenditures in terms of energy and apparatus.

The total content of $CO_2$ and $H_2O$ does not correspond to the equilibrium, hence after admixture of the cooling gas there will be CO— and $H_2$-decomposition on the way to the reduction reactor 8 in accordance with the formulae: $2CO \leftrightarrows CO_2+C$ (Boudouard reaction) and $CO+H_2 \leftrightarrows H_2O+C$ (heterogeneous water-gas reaction) respectively, which decomposition is strongly exothermic. Hence there results an increase in temperature which may necessitate the feeding of further cooling gas. The increase in temperature leads to the formation of agglomerates of the reactor material. Further, there will be a chemical attack on the pipes, built-in elements etc. made from metallic material that further convey the reducing gas. In addition, by the reaction of CO and $H_2$ the effective amount of gas for the reduction is decreased.

EXAMPLE II

To a reducing gas of the chemical composition in accordance with Table I, a gas rich in $CO_2$ and having a temperature of 70° C. is supplied at a pressure of 4.5 bar abs. The analysis of the gas rich in $CO_2$ is shown in Table II below.

TABLE II

| | |
|---|---|
| CO | 13% |
| $H_2$ | 2% |
| $CO_2$ | 77% |
| $H_2O$ | 5% |
| $CH_4$ | 1% |
| $N_2$ | 2% |

By adding 12.3% of a cooling gas of the same type in accordance with Example I and 10.7% of the gas rich in $CO_2$ in accordance with Table II to the reducing gas in accordance with Table I, there results a reducing gas having a temperature of 850° C. and a pressure of 4.5 bar abs., showing the chemical composition represented in Table III.

TABLE III

| | |
|---|---|
| CO | 60.5% |
| $H_2$ | 27.5% |
| $CO_2$ | 7.6% |
| $H_2O$ | 1.4% |
| $CH_4$ | 1.0% |
| $N_2$ | 2.0% |

With this reducing gas, the total content of $CO_2$ and $H_2O$ is close to the equilibrium value at 850° C., such that decomposition of CO and $H_2$ can be almost completely avoided. The gas rich in $CO_2$ is fed into the cooling-gas cycle, f.i. into the recycle duct 28 in accordance with the Figure. It can be seen that a substantial reduction in size of the cooling-gas cycle is possible, as only 12.3% cooling gas have to be added instead of 27.8% cooling gas in accordance with Example I. In accordance with Example II it is feasible to put to a suitable use the gases of low calorific value, i.e. gases that are rich in $CO_2$. In the reduction of iron ore with the reducing gas thus conditioned, excessive heating of the reactor material is reliably avoided, the reduced material can without difficulty be passed on into the melter gasifier 10.

EXAMPLE III

In accordance with this Example, withdrawn top-gas from the reduction reactor 8 upon suitable purification, cooling and compression is admixed to the reducing gas exiting the melter gasifier 10, at a temperature of 70° C. and 4.5 bar abs. The chemical analysis of the top gas is given in Table IV below.

TABLE IV

| | |
|---|---|
| CO | 42% |
| $H_2$ | 19% |
| $CO_2$ | 34% |
| $H_2O$ | 2% |
| $CH_4$ | 1% |
| $N_2$ | 2% |

By admixing to the reducing gas 23.3% top gas, a gas mixture is formed having a temperature of 850° C. and a pressure of 4.5 bar abs. and the chemical analysis shown in Table V. Here, again, the total content of $CO_2$ and $H_2O$ is close to the equilibrium, so that here, too, a Boudouard and heterogeneous water-gas reaction is almost completely avoided.

TABLE V

| | |
|---|---|
| CO | 60.6% |
| $H_2$ | 27.9% |
| $CO_2$ | 7.3% |
| $H_2O$ | 1.2% |
| $CH_4$ | 1.0% |
| $N_2$ | 2.0% |

In accordance with Example III there is likewise required a smaller amount of gas for cooling the reducing gas exiting the melter gasifier 10 than is required in accordance with Example I. The top gas is admixed into the ducts 17 or 28 respectively, via a branch duct 41 running from the top-gas discharge duct 30 to the duct 17, said branch duct being conducted via a suitable cooling means and a compressor. Optionally, admixture is effected via the feed-in sites 40.

EXAMPLE IV

In accordance with Example IV, $H_2O$-vapor is admixed to a cooling gas of the same type. The chemical compositions of the reducing gas exiting the melter gasifier 10 and of the cooling gas are identical to the chemical compositions given in Example I.

The vapor (100% $H_2O$) is admixed at a temperature of 250° C. and a pressure of 12 bar abs. When admixing 18% cooling gas with 8.5% water vapor, a reducing gas forms having a temperature of 850° C. and a pressure of 4.5 bar abs. The chemical analysis of the reducing gas is given in Table VI below.

TABLE VI

| | |
|---|---|
| CO | 60.7% |
| $H_2$ | 28.0% |
| $CO_2$ | 0.9% |
| $H_2O$ | 7.6% |
| $CH_4$ | 0.9% |
| $N_2$ | 1.9% |

This variant also offers the advantage of the cooling-gas cycle being constructed on a small scale, with the total content of $CO_2$ and $H_2O$ being approximately in equilibrium. An additional advantage resulting with this variant is a slight change in the amount of reductants.

What is claimed is:

1. A method for producing a hot CO- and $H_2$-containing gas serving for the reduction of fine-grained metal ore, wherein the reducing gas is formed in a gasification zone by a gasification of carbon carriers taking place under the supply of oxygen and subsequently is cooled down to a reducing-gas temperature favorable to the reduction process, characterized in that in order to prevent the Boudouard and heterogeneous water-gas reaction and a resultant heating of the reducing gas, $H_2O$ and/or $CO_2$ is added to a reducing gas which has been subjected to a cooling operation that does not effect an addition of $H_2O/CO_2$ to the reducing gas, whereby the reducing gas is converted to a reducing gas that is thermodynamically more stable at the reducing-gas temperature.

2. A method according to claim 1, characterized in that amounts of $H_2O$ and/or $CO_2$ are added until the Boudouard and heterogeneous water-gas equilibrium of the reducing gas at the temperature of the reduction process is almost attained.

3. A method according to claim 1, characterized in that $H_2O$ is added by feeding water vapor.

4. A method according to claim 1, characterized in that $CO_2$ is added by feeding a $CO_2$-containing gas.

5. A method according to claim 3, characterized in that a reducing gas reacted in a reduction process is fed into the reducing gas.

6. A method according to claim 1, characterized in that cooled reducing gas of the same composition is admixed with the reducing gas and $H_2O$ and/or $CO_2$ are added to the cooled reducing gas.

7. A plant for carrying out the method according to claim 1, comprising at least one reduction reactor (8) having a conveying duct (7) for metal ore and a reducing-gas duct (17) running into it, comprising a gasification reactor (10) having feed ducts (11, 12) for carbon carriers and oxygen-containing gases running into it and the reducing-gas duct (17) departing from it, and comprising a cooling means which is provided in the reducing-gas duct (17) and does not effect an addition of $H_2O/CO_2$ to the reducing gas, characterized in that a $CO_2$ source and/or $H_2O$ source is (are) flow-connected with the reducing-gas duct (17) conducting a reducing gas which has been subjected to cooling.

8. A plant according to claim 7, characterized in that the reduction reactor (8) is provided with a top-gas discharge duct (6, 30) carrying off reacted reducing gas from which a branch duct (41) departs that is flow-connected with the reducing-gas duct (17).

9. A plant according to claim 7, characterized in that from the reducing-gas duct (17) a reducing-gas recycle duct (28) via a scrubber (26) and a compressor (27) runs into the reducing-gas duct (17) again, but viewed in the gas flow direction at a position upstream of the branching-off point of the reducing-gas recycle duct (28), particularly upstream of the position of a dedustifying means (25) provided in the reducing-gas duct (17), and that a $CO_2$ source and/or $H_2O$ source is connected with the reducing-gas recycle duct (28).

10. A method according to claim 1, characterized in that the metal ore is iron ore.

11. A method according to claim 1, characterized in that the carbon carrier is coal.

* * * * *